United States Patent Office 2,821,265
Patented Jan. 28, 1958

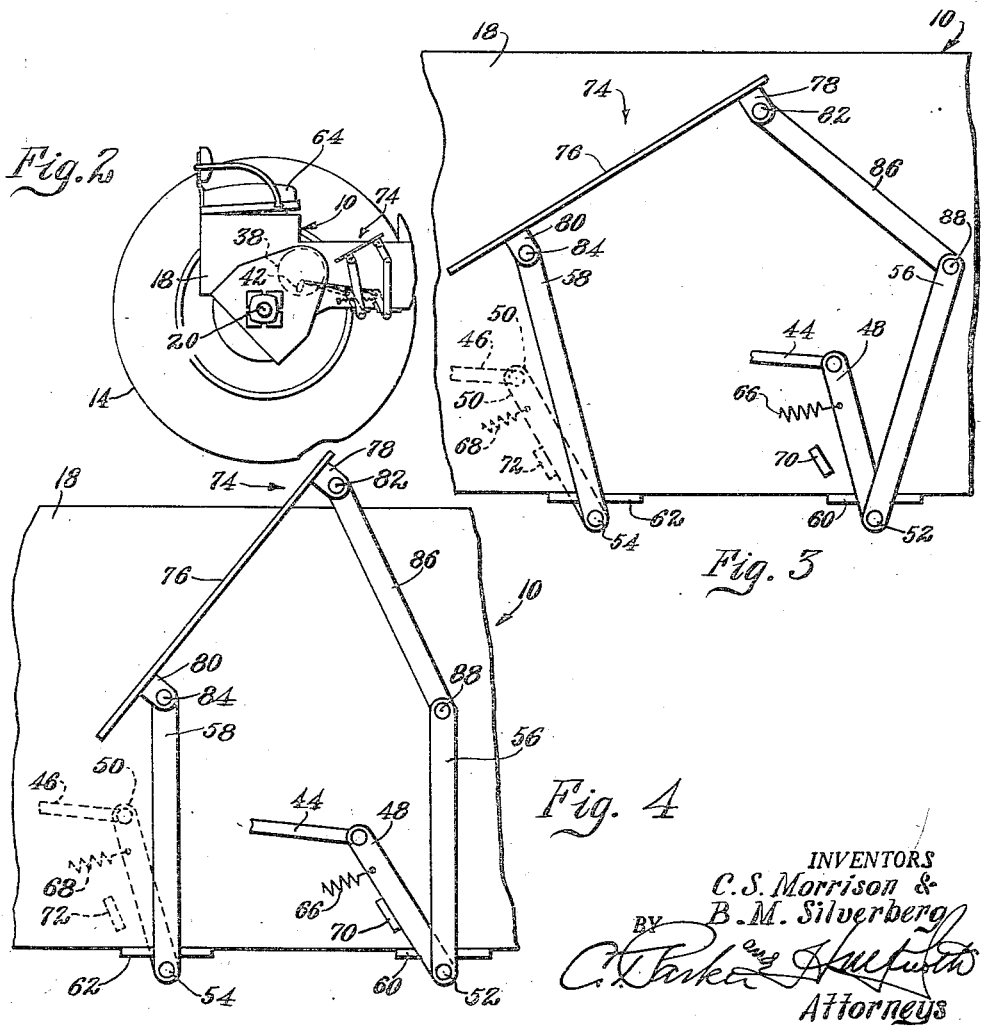

2,821,265

SELECTIVE BRAKE CONTROL MEANS

Charles S. Morrison, Moline, and Bernard M. Silverberg, Rock Island, Ill., assignors to Deere & Company, Moline, Ill., a corporation of Illinois Application June 25, 1953, Serial No. 363,954

4 Claims. (Cl. 188—16)

This invention relates to selective brake control means for vehicles and more particularly to a vehicle of the agricultural tractor type wherein it is important to selectively control the differentially driven rear traction wheels.

The conventional agricultural tractor—or tractors of allied types—has power-apportioning or differential drive means connecting the left-hand and right-hand rear axles. The traction wheels are keyed to these axles and individual brake means, one for each wheel, are utilized for facilitating steering of the tractor, since the brakes may be individually applied. It is conventional practice to locate the brake pedals or equivalent brake control members in close proximity to each other so that the operator may with one foot depress both pedals simultaneously if he desires to apply the brakes in unison. As indicated, the application of the brakes individually is desirable to facilitate steering. Individual application is also important in preventing stalling of the tractor, since the slipping wheel may be braked. On the other hand, equalized application of the brakes is necessary from the standpoint of safety when the tractor is operating at high speeds, as on the highway, for example.

According to the present invention, a single control member is connected to the brake means and is effective to operate the brakes either individually or in unison, thus avoiding the necessity for a pair of brake pedals or equivalent control members. It is a feature of the invention to arrange the single brake operator member in the form of a toggle so that the linkage making up the toggle may be spread apart to force one brake lever against a stop while moving the other brake lever away from its stop and in the direction of brake application. The links may be closed to reverse the procedure; that is to say, to force the other lever against its stop and to force the first mentioned lever away from its stop so that that brake is applied. The toggle is shiftable in its entirety to move both levers simultaneously for applying both brakes in unison. It is a further feature of the invention to provide brake control means that may be readily applied to tractors of existing types. The brake control means according to the present invention is of simple construction, may be economically produced and requires little attention and maintenance.

The foregoing and other important objects and desirable features inherent in and encompassed by the invention will become apparent as a preferred embodiment of the invention is disclosed in the following detailed description and accompanying sheet of drawings wherein Fig. 1 is a plan view of a representative type of tractor, with a portion of the transmission casing thereof broken away to expose the drive mechanism.

Fig. 2 is a fragmentary side view of the tractor of Fig. 1, with the near traction wheel removed to expose the brake control means.

Figs. 3 and 4 are fragmentary views, each on an enlarged scale, showing how the brake levers are individually rocked.

Throughout the specification, reference will be had to the vehicle as having front and rear ends and right-hand and left-hand sides. These terms are used in the interests of brevity and clarity and are not designed to limit the spirit and scope of the invention.

Although, as will appear as the description progresses, the invention is applicable to vehicles in general, it is particularly applicable to an agricultural tractor. For that purpose, an agricultural tractor has been chosen as the basis of illustration. Such tractor is shown in the drawings as comprising a longitudinal supporting frame 10 carried at its rear on right- and left-hand traction wheels 12 and 14 and at its front end on a steerable truck 16, the tractor being of the so-called tricycle type. The rear portion of the supporting frame is in the form of a transmission and final drive casing or housing 18 in which are journaled coaxial right- and left-hand driving parts in the form of shafts or axles 20 and 22. The tractor includes a power plant, such as an internal combustion engine (not shown), as is conventional. Many of the details, considered unimportant here, have been omitted, but these may be supplied by reference to the U. S. patent to Maxon 2,340,134.

The power plant ultimately delivers power to a power-apportioning means in the form of a conventional differential 24 having right- and left-hand output shafts 26 and 28. These shafts have respectively keyed thereto driving pinions 30 and 32 which are in constant mesh with bull gears 34 and 36 keyed respectively to the axles 20 and 22.

Each output shaft 26 may be selectively braked or released by conventional brake means, the numerals 38 and 40 respectively designating the right- and left-hand brake means. Since the output shafts 26 and 28 are geared respectively to the right- and left-hand traction wheels 12 and 14, it follows that these wheels are under the control of the brake means.

Although the foregoing relates to what may be termed a conventional driving and braking mechanism, modified forms of the design illustrated may be resorted to without sacrificing any of the advantages of the invention.

Each of the brake means 38, 40 may be of the internal expanding type, controlled by a wedge or cam (not shown) including a short operating lever as suggested at 42 in Fig. 2. These details are, however, broadly immaterial. For present purposes, it will suffice to recognize that the brake means 38 and 40 are respectively under control of means including right- and left-hand forwardly extending control links 44 and 46. The forward ends of these links are connected respectively to right- and left-hand brake control members or levers 48 and 50. These levers are respectively keyed at their lower ends to right- and left-hand rockshafts 52 and 54. These rockshafts extend transversely of the supporting frame 10, and are of different lengths (Fig. 1) in accordance with the transverse spacing of the brake means 38 and 40.

The right-hand ends of the rockshafts 52 and 54 are in close proximity at the right-hand side of the tractor and these ends respectively have keyed thereto upstanding members or levers 56 and 58. For present purposes, the lever 48, rockshaft 52 and lever 56 may be considered one lever or one member, the three components being necessary only to accommodate the particular design. The same is true of the lever 50, rockshaft 54 and lever 58. The rockshafts 52 and 54 may be mounted by any suitable means on the underside of the supporting frame 10, representative bearings 60 and 62 being illustrated for that purpose.

The levers 56 and 58 may be of substantially equal length and stand upright in a position convenient to an operator's seat 64 at the rear of the tractor. The levers are respectively biased, by biasing means such as springs 66 and 68 to normal positions, which normal positions are established by first and second stop means 70 and 72.

The levers 56 and 58, and accordingly the brake means 38 and 40, may be individually or simultaneously operated by operator means designated generally by the numeral 74. This means comprises a single operator member 76 having at its opposite ends depending lugs 78 and 80 which provide combined fulcrum and force-transmitting means 82 and 84. The means 84 is connected directly to the free or upper end of the lever 58, and the means 82 is connected by a force-transmitting link 86 to the free or upper end of the lever 56, the latter connection being effected by a combined fulcrum and force-transmitting connection 88. The operator member 76 and link 86, being pivotally interconnected, and being pivotally connected to the upper ends of the levers 56 and 58, establish a toggle means for controlling the levers 56 and 58 either in unison or individually, according to the application of force directed by the operator against the operator member 76.

Fig. 3 illustrates the application of the right-hand brake means 38, to the exclusion of application of the left-hand brake means 40, because of depression of the forward part of the operator member 76. As this part of the operator member is depressed, force is transmitted through the link 86 to the upper end of the right-hand brake-operating lever 56. At the same time, the reaction is against the lever 58 which, in addition to being held in its normal position by the biasing spring 68, is forced back against its stop 72. Consequently, the lever 58 is stationary and establishes a fulcrum at 84 about which the operator member 76 pivots as it transmits force forwardly through the link 86 to rock the lever 56 forwardly and away from its stop 70 as illustrated.

Fig. 4 shows what occurs when the left-hand brake is applied to the exclusion of the right-hand brake. In this case, force is applied to the rear end of the operator member 76, causing the member to shift downwardly at its rear and upwardly at its front, tensioning the link 56 and exerting a rearward force on the right-hand operating lever 56. This force urges the lever 56 against its stop 70, against which it is already biased by the spring 66. Therefore, the lever 56 and its connection to the operator member 76, establishes a fulcrum, as it were, about which the operator member 76 fulcrums to swing the left-hand brake-operating lever 58 forwardly and away from its stop 72, as illustrated.

If it is desired to apply both brakes simultaneously, force is applied equally to both ends of the brake operator 76, which may be best considered by assuming that the force is applied in the proper direction to a portion of the operator member 76 intermediate its ends, thus shifting the member and its associated link 86 as a unit to move both brake-operating levers 56 and 58 forwardly. This phase of the operation has not been illustrated, but it will be obvious from an inspection of the mechanism as shown.

Stated otherwise, the operator member 76 and its associated link 86 form a toggle which, as shown in Fig. 3, is spreadable to move the lever 56 forwardly and which, as shown in Fig. 4, is closable to move just the lever 58 forwardly. The toggle 76—86 is movable in its entirety to rock both levers.

Various features of the invention not specifically enumerated will undoubtedly occur to those skilled in the art as likewise will numerous modifications and alterations in the preferred embodiment of the invention illustrated, all of which may be achieved without departing from the spirit and scope of the invention.

What is claimed is:

1. Selective brake control mechanism for a vehicle having a supporting frame journaling first and second rotatable parts that are selectively braked and released by individual first and second brake means, said mechanism comprising: first and second individual brake levers connected respectively to the first and second brake means and individually rockable on the supporting frame from normal positions to brake-applying positions and biased to said normal positions with their free ends spaced apart; a brake operator member having spaced apart first and second end portions; and first and second connecting means supporting the operator member at its first and second end portions respectively on the free ends of the first and second levers, each connecting means including a fulcrum on and a force-transmitting connection to its associated lever so that the operator member may fulcrum at one end on one normally positioned lever and transmit force through its other end to rock the other lever for applying only the brake means associated with the last-mentioned lever and so that force applied to the operator member intermediate its ends will cause said member to transmit force to rock both levers simultaneously from their normal positions for applying both brake means.

2. Selective brake control mechanism for a vehicle having a supporting frame journaling first and second rotatable parts that are selectively braked and released by individual first and second brake means, said mechanism comprising: first and second individual brake control members connected respectively to the first and second brake means and individually movable on the supporting frame from normal positions to brake-applying positions and biased to said normal positions with their free ends spaced apart; a brake operator member having spaced apart first and second end portions; and first and second connecting means supporting the operator member at its first and second end portions respectively on the free ends of the first and second control members, each connecting means including a fulcrum on and a force-transmitting connection to its associated control member so that the operator member may fulcrum at one end on one normally positioned control member and transmit force through its other end to move the other control member for applying only the brake means associated with the last-mentioned control member and so that force applied to the operator member intermediate its ends will cause said member to transmit force to move both control members simultaneously from their normal positions for applying both brake means.

3. Selective brake control mechanism for a vehicle having a supporting frame journaling first and second rotatable parts that are selectively braked and released by individual first and second brake means, said mechanism comprising: first and second individual brake levers connected respectively to the first and second brake means and individually rockable on the supporting frame from normal positions to brake-applying positions and biased to said normal positions with their free ends spaced apart; a brake operator member having spaced apart first and second end portions; and first and second connecting means supporting the operator member at its first and second end portions respectively on the free ends of the first and second levers for rocking of the levers either individually or in unison, said first connecting means including a fulcrum and a force-transmitting connection connecting the first end of the operator member directly to the free end of the first lever, and said second connecting means including a force-transmitting link pivotally connected at its opposite ends respectively to the second end of the operator member and to the free end of the second lever.

4. Selective brake control mechanism for a vehicle having a supporting frame journaling first and second rotatable parts that are selectively braked and released by individual first and second brake means, said mechanism comprising: first and second individual brake levers connected respectively to the first and second brake means and individually rockable on the supporting frame from normal positions to brake-applying positions; first and second stop means on the supporting frame and respectively engageable with the levers, each stop means limiting movement of its lever in one direction; first and second biasing means effective respectively on the levers to hold them in their normal positions against their stop means; and brake operator means in the form of a toggle pivotally connected at its opposite ends respectively to the levers and selectively spreadable to force the first lever against its stop means and to force the second lever away from its stop means, closable to force the second lever against its stop means and to force the first lever away from its stop means, and shiftable as an entirety to rock both levers simultaneously away from their respective stop means.

References Cited in the file of this patent

UNITED STATES PATENTS

| | | |
|---|---|---|
| 1,342,934 | Baits et al. | June 8, 1920 |
| 1,707,299 | Davis | Apr. 2, 1929 |
| 1,752,209 | Smith | Mar. 25, 1930 |
| 1,774,451 | Norelius | Aug. 26, 1930 |
| 2,111,686 | Warren | Mar. 22, 1938 |
| 2,321,614 | Palmer et al. | June 15, 1943 |
| 2,483,224 | Narcovich | Sept. 27, 1949 |
| 2,540,458 | Roeder et al. | Feb. 6, 1951 |
| 2,620,050 | Menard | Dec. 2, 1952 |
| 2,652,905 | Arnio | Sept. 22, 1953 |